United States Patent [19]

Georgoudis

[11] 4,122,073
[45] Oct. 24, 1978

[54] THERMOPLASTIC COPOLYESTERS PREPARED FROM AROMATIC DICARBOXYLIC ACID, SUBSTITUTED SUCCINIC ACID OR ANHYDRIDE, A GLYCOL AND A POLYMERIC POLYOL AND THE USE THEREOF IN ADHESIVES

[75] Inventor: Paul C. Georgoudis, Dunellen, N.J.

[73] Assignee: National Starch and Chemical Corporation, Bridgewater, N.J.

[21] Appl. No.: 820,452

[22] Filed: Aug. 1, 1977

[51] Int. Cl.$^2$ ............................................. C08L 67/02
[52] U.S. Cl. .................................... 260/873; 260/26;
260/860; 528/302
[58] Field of Search .......... 260/26, 75 R, 860, 75 NR,
260/75 EP, 75 T

[56] References Cited

U.S. PATENT DOCUMENTS

| 3,329,740 | 7/1967  | Battersby        | 260/860    |
| 3,383,343 | 5/1968  | Mohajer et al.   | 260/22     |
| 3,390,108 | 6/1968  | Keck et al.      | 260/7.5    |
| 3,542,737 | 11/1970 | Keck et al.      | 260/75 R   |
| 3,804,921 | 4/1974  | Jamison          | 260/75 EP  |
| 3,832,314 | 8/1974  | Hoh et al.       | 260/26     |
| 3,975,323 | 8/1976  | Georgoudis et al.| 260/75 UA  |

FOREIGN PATENT DOCUMENTS 1,398,551  3/1965  France ..................... 260/75 R Primary Examiner—M. J. Welsh
Attorney, Agent, or Firm—James & Franklin

[57] ABSTRACT

A copolyester is formed of at least one aromatic dicarboxylic acid member, at least one aliphatic dicarboxylic acid member (an alkyl- or alkenyl-substituted succinic acid or anhydride thereof), at least one $C_2$–$C_{10}$ glycol, at least one polymeric polyol member, and an optional polymeric polycarboxylic acid member. The polymeric polyol member is either a polymeric polyol having a molecular weight of 300–3,000, or a mixture of polymeric diol having a molecular weight of 300–3,000 and a non-polymeric polyol. The polymeric polyol may be a polyester such as polycaprolactone or a polyether such as a trimethylolpropane/propylene oxide adduct. The preferred resultant thermoplastic copolyester has a glass transition temperature of less than 0° C. and a high polymer melting temperature. It is useful as an adhesive both by itself and as an ingredient of hot melt or solution adhesive formulations. In producing the copolyester, an intermediate copolyester of the aromatic dicarboxylic acid member, the alkphatic dicarboxylic acid member, and the glycol is chain extended by reaction with the polymeric polyol member and optional polymeric polycarboxylic acid member in a 2–7 hour reaction at about 225°–265° under about 1–30 mm. Hg. pressure absolute.

48 Claims, No Drawings

THERMOPLASTIC COPOLYESTERS PREPARED FROM AROMATIC DICARBOXYLIC ACID, SUBSTITUTED SUCCINIC ACID OR ANHYDRIDE, A GLYCOL AND A POLYMERIC POLYOL AND THE USE THEREOF IN ADHESIVES

BACKGROUND OF THE INVENTION

This invention relates to novel copolyesters and adhesive compositions formed therefrom.

Vinyl materials often contain a significant amount of plasticizer to render them soft and flexible, the most common and least expensive plasticizer being di-2-ethylhexyl phthalate (di-octyl phthalate), although di-octyl isophthalate, di-octyl adipate, di-octyl sebacate, and other polymeric and non-polymeric plasticizers are also useful. Various problems have been associated with the use of adhesives for plasticized vinyl substrates such as vinyl wall coverings, vinyl tile, edge banding and other vinyl laminations. For instance, over a period of time the plasticizers from the highly plasticized vinyl substrate tend to migrate to the adhesive/substrate interface, and even into the adhesive itself. Attack of the adhesive interface by the plasticizer results in a rapid loss in adhesion, and attack of the adhesive itself by the plasticizer results in a loss of cohesion or internal strength of the adhesive, accompanied by splitting and transfer.

Conventional solution and hot-melt adhesives employing, for example, ethylene/vinyl acetate copolymers and rubber based adhesives are rapidly attacked by the migrating plasticizers from the vinyl substrate resulting in a decrease in the tensile peel values of the adhesive bond to very low levels (when the plasticizer migrates into the interface) and a loss of cohesive strength of the adhesive (when the plasticizer migrates into the adhesive). Accompanying the migration of plasticizer from the vinyl substrate is a rapid shrinkage of the vinyl sbustrate by as much as 5 to 10%. While the acceptable degree of vinyl shrinkage or decrease in peel strength will, of course, vary with the application, typical requirements for the adhesives utilized in connection with vinyl substrates are a 40–150 ozs./linear inch peel strength (or bond value) with less than a 30% decrease after aging for one week at 70° C., and less than 0.5% vinyl shrinkage, with no adhesive splitting or transfer, after similar aging.

Additional requirements for both hot melt and solution adhesives in general are high heat resistance or heat distortion temperature (i.e., the ability to form an adhesive bond which withstands high temperatures without softening and losing adhesion and adherence) and cold resistance (i.e., the ability to form a flexible adhesive bond which withstands low temperatures without becoming brittle). Of course, in the case of solution adhesives, it is necessary also that the adhesives be applicable to a substrate from a solution, and in the case of hot melt adhesives that the adhesives have high thermal or heat stability at elevated temperatures (i.e., the ability to resist degradation or gelation at high temperatures over time). Both require good wetting characteristics for good adhesion, low viscosity for ease of application, good cohesive strength, color (preferably clear or light), and compatibility with a large variety of tackifying resins, plasticizers, solvents, modifiers, pigments and the like.

Good low temperature properties are usually associated with polymers having a low glass transition temperature, high heat resistance with crystalline or semi-crystalline polymers, and good cohesive strength with high molecular weight polymers and crystalline or semi-crystalline polymers.

Copolyesters of ethylene glycol, terephthalic acid and dimer acid and similar copolyesters have been described in various patents such as U.S. Pat. Nos. 3,383,343; 3,390,108; 3,329,740 and French Pat. No. 1,398,551. Such copolyesters have not proven to be especially useful as adhesives for vinyl substrates despite their low shrinkage levels, because they are not highly resistant to plasticizer migrating from the vinyl substrate. Typically the peel strength decreases by at least 50% on aging, with accompanying adhesive transfer and splitting. Attempts to improve the adhesive properties of such copolyesters by chain extending the copolyesters with various non-polymeric polyols such as trimethylol propane and various polyether polyols such as trimethylol propane/ethylene oxide adducts have not proven successful. Another feature inhibiting the use of such copolyesters has been the cost and difficulty in manufacturing. In conventional copolyester manufacture, high temperatures (up to 280° C.), high vacuum (1.0–0.1 mm. Hg.) and long polycondensation times are required to obtain products exhibiting useful adhesive characteristics. Such extreme conditions do not always result in the best obtainable products due to degradation reactions occurring during polycondensation, and of course increase the cost of manufacture.

U.S. Pat. No. 3,975,323 issued Aug. 17, 1976, describes copolyesters of the type mentioned above which have been chain extended with a polyester polyol to increase the molecular weight thereof to provide increased plasticizer migration tolerance without loss of cohesive or adhesive properties, even at elevated termperature storage. The chain-extended copolyesters are characterized by glass transition temperature of less than 0° C. and a melting temperature greater than 70° C. Nonetheless, these chain-extended copolyesters have not proven to be entirely satisfactory. For instance, compatibility of the chain-extended copolymers with hydrocarbon-type solvents, tackifying resins, and non-oxidized polyethylene waxes is less than desired. Furthermore, adhesion of the chain-extended copolyesters to particular substrates such as the urea-and phenol-formaldehyde resins (available under the trade name FORMICA) is not as high as desired. Finally, many chain-extended copolyesters tend to set too fast, thereby resulting in an inadequate wetting and premature shrinkage and so weakening the adhesive bond.

Copolyesters of ethylene glycol, terephthalic acid and particular substituted succinic acid have been described in U.S. Pat. No. 3,542,737. The copolyesters are prepared using polycondensation temperatures of 275° C., at which temperature succinic compositions tend to decompose (i.e., decarboxylate), thus causing chain termination and so lowering the molecular weight of the final copolyester. However, the patent teaches the use of such low percentages of the succinic constituent (0.5–15 percent based on the moles of acid units in the copolyester) that, as a matter of fact, the succinic constituent plays very little part in the overall reaction.

Accordingly, it is an object of the present invention to provide a novel copolyester which is a high molecular weight chain-extended aromatic dicarboxylic acid-/aliphatic dicarboxylic acid/glycol copolyester useful as an adhesive.

Another object is to provide such an adhesive which inhibits shrinking of a vinyl substrate and is resistant to plasticizer migrating from the vinyl substrate.

A further object is to provide such an adhesive exhibiting a 40–150 ounces/linear inch peel strength with a maximum 30% decrease in strength after aging (1 week at 70° C.) and a maximum 0.5% shrinkage of the vinyl substrate with no adhesive splitting or transfer after similar aging.

It is also an object to provide an adhesive exhibiting good thermal stability, high heat and cold resistance, good wetting characteristics, low viscosity, good cohesive strength, and a high compatibility with a large variety of tackifying resins, plasticizers, solvents, modifiers, pigments, etc.

It is a further object to provide a method of manufacturing such polyesters under very mild conditions involving temperatures no higher than 265° C., pressures of 1–30 mm. Hg. and relatively short polycondensation times of 2–7 hours.

SUMMARY OF THE INVENTION

It has now been found that the above and related objects of the present invention are provided by a copolyester of at least one aromatic dicarboxylic acid member, at least one aliphatic dicarboxylic acid member, at least one $C_2$–$C_{10}$ glycol, at least one polymeric polyol member utilized as a chain extender and optionally a polymeric polycarboxylic acid member. The aromatic dicarboxylic acid member is an aromatic dicarboxylic acid or an acid functioning derivative thereof, and is preferably symmetrical; e.g., terephthalic acid or dimethyl terephthalate. The aliphatic dicarboxylic acid member is a substituted succinic acid or anhydride thereof, the succinic acid having alkyl or alkeynyl $C_4$–$C_{36}$ group substituents. The $C_2$–$C_{10}$ glycol is preferably 1,4-butanediol or 1,6-hexanediol.

The chain extending polymeric polyol member is either a polymeric polyol having a molecular weight of about 300–3,000 and a hydroxyl functionality greater than 2, or a mixture of a polymeric diol having a molecular weight of about 300–3,000 and a non-polymeric polyol having a hydroxyl functionality greater than 2, or a mixture thereof. The polymeric polyol is present in an amount of about 0.1–6.0 mole percent of the total dicarboxylic acid members in the copolyester, and the polymeric diol and the non-polymeric polyol are each present in the mixture in an amount of about 0.1–6.0 mole percent of the total dicarboxylic acid members in the copolyester. The polymeric polyol is preferably a polyester such as polycaprolactone or a polyether such as a trimethylolpropane/propylene oxide adduct.

The optional polymeric polycarboxylic acid member is a polycarboxylic acid having carboxyl functionality greater than 2, or an acid functioning derivative thereof. The polymeric polyol, polymeric diol and polymeric polycarboxylic acid member combined are present in an amount of about 0.1–6.0 mole percent of the total dicarboxylic acid members in the copolyester.

The thermoplastic copolyesters of the present invention are prepared by forming an intermediate copolyester of the aromatic dicarboxylic acid member, the aliphatic dicarboxylic acid member and the $C_2$–$C_{10}$ glycol, and chain extending the intermediate copolyester by reaction thereof with the polymeric polyol member and optional polymeric polycarboxylic acid member for about 2–7 hours at about 225°–265° C. and about 1–30 mm. Hg. pressure absolute. The preferred resultant copolymers are characterized by a glass transition temperature less than 0° C., and a high polymer melting temperature.

The copolyesters thus produced are hot melt or solution adhesives which may be used as such by themselves or compounded in various ways to lend themselves either to pressure sensitive adhesive formulations useful for vinyl wall coverings, labels, decals and the like, or to non-pressure sensitive adhesive formulations useful as structural adhesives for packaging, edge banding and laminating paper, cloth, wood, vinyl, etc. Suitable tackifying resins for the polyesters include rosins and rosin esters; aromatic hydrocarbon resins such as styrene polymers and copolymers; coumarone-indene resins; aromatic-aliphatic copolymer resins; aromatic petroleum oils; and phenolic polymer and copolymer resins. Additionally, conventional modifiers, extenders, antioxidants, ultraviolet stabilizers, plasticizers and pigments may be included in the formulation as desired for particular applications.

DETAILED DESCRIPTION OF THE PREFERRED EMBODIMENTS

The copolyesters of the present invention are prepared from at least one aromatic dicarboxylic acid member, at least one aliphatic dicarboxylic member, at least one $C_2$–$C_{10}$ glycol member, at least one polymeric polyol member and an optional polymeric polycarboxylic acid member.

In discussing the composition and preparation of the copolyester, the terms "polyol" and "polycarboxylic acid" will be restricted to compounds having a hydroxyl or carboxyl functionality, respectively, greater than 2, while the terms "diol" and "dicarboxylic acid" will be restricted to compounds having a hydroxyl or carboxyl functionality, respectively, of exactly 2, thus making the terms "diol" and "polyol" mutually exclusive and the terms "polycarboxylic acid" and "dicarboxylic acid" mutually exclusive.

The term "total dicarboxylic acid members" includes both the aromatic dicarboxylic acid members and the aliphatic dicarboxylic acid members. Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—. The term "aromatic dicarboxylic acids and their acid functioning derivatives", as used herein, includes equivalents of aromatic dicarboxylic acids in reaction with glycols and polyols in forming copolyesters. These equivalents include esters and ester-forming derivatives, such as acid halides and anhydrides. Representative aromatic dicarboxylic acids and their acid functioning derivatives include terephthalic, phthalic and isophthalic acids, bibenzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, phenanthrene dicarboxylic acid, 2,7-naphthalene dicarboxylic acid, anthracene dicarboxylic acid, 4,4'-sulfonyl dibenzoic acid and $C_1$–$C_{12}$ alkyl and ring substitution derivatives thereof, such as halo, alkoxy, and aryl derivatives.

The aromatic dicarboxylic acid member of the copolyester is an aromatic dicarboxylic acid, or an acid functioning derivative thereof, as defined above. The symmetrical members of the class, e.g., terephthalic acid and dimethyl terephthalate, are preferred. Due to its low cost relative to other symmetrical members of the class and its ready availability in a relatively pure form, dimethyl terephthalate is a preferred member of the class. In determining the best aromatic dicarboxylic acid member for use in the copolyester, attention should be paid both to the symmetrical nature of the compound (to insure crystallinity within the copolyester) and to the melting point of the homopolymer of the member (to insure that the copolyester has a relatively high melting point).

The aliphatic dicarboxylic acid member of the copolyester is a substituted succinic acid or anhydride thereof, the succinic acid having one or two alkyl or alkenyl $C_4-C_{36}$, preferably $C_8-C_{18}$, group substituents, preferably only one. Preferred alkyl substituted succinic acid members include n-octadecyl succinic acid, and preferred alkenyl substituted succinic acids include n-octenyl succinic acid, iso-octenyl succinic acid, iso-octadecenyl succinic acid, etc. Non-substituted succinic acid and other aliphatic dicarboxylic acids (whether substituted or not), such as adipic, sebacic and azelaic acids, are inoperative in the present invention, although they may be used in small amounts, in addition to the aliphatic dicarboxylic acid member, to modify particular copolyester properties.

The glycol member of the copolyester has from 2 to 10 carbon atoms and may be 1,2-ethanediol (also called ethylene glycol), 1,4-butanediol, 1,6-hexanediol, diethylene glycol, triethylene glycol, tetraethylene glycol, 2,2-dimethyl-1,3-propandediol (also called neopentyl glycol), or the like, the 1,4-butanediol and 1,6-hexanediol being preferred. It is preferred that the glycol used in the copolyester be one whose homopolymer has a high melting point.

Glycols having more than ten carbon atoms, including various polymerized glycols (such as those available from Union Carbide under the trade name CARBOWAX) are inoperative in the present invention, although they may be used in small amounts, in addition to the glycol member, to modify particular copolyester properties.

The polymeric polyol member of the copolyester is either a polymeric polyol having a molecular weight of from about 300 to about 3,000, or a mixture of a polymeric diol having a molecular weight of from about 300 to 3,000 and a non-polymeric polyol. The polymeric polyols and polymeric diols preferably have a molecular weight less than 1,000. The polymeric polyols are preferably polyester polyols or polyether polyols. Typical of the polyester polyols useful in the present invention are the reaction of products of polyfunctional alcohols (such as glycerol, trimethylol propane, trimethylol ethane, pentaerythritol, etc.) with lactones (such as propiolactone, butyrolactone, etc.). Typical of the polyether polyols useful in the present invention are the reaction products of the polyfunctional alcohols (such as those mentioned above) with alkylene oxides (such as ethylene oxide, propylene oxide, butylene oxide, etc.). Preferred polyester polyols are the polycaprolactone polyols such as that sold by Union Carbide under the trade names NIAX POLYOL PCP 0300 (molecular weight about 540), PCP 0310 (molecular weight about 895), etc. Preferred polyether polyols are the trimethylolpropane/propylene oxide adduct triols, such as that sold by Wyandotte Chemical Co. under the trade name PLURACOL TP-440 (molecular weight about 440) etc.

Polymeric diols of the mixture are preferably polyester or polyether diols, and are typically the reaction products of difunctional alcohols with either the aforementioned lactones or the aforementioned alkylene oxides. Preferred polyether diols are the polytetramethylene glycols such as that sold by DuPont under the trade name POLYGLYCOL 1000, and preferred polyester diols are the polycaprolactone diols such as that sold by Union Carbide under the trade name NIAX POLYOL PCP 0210 (molecular weight about 812). The nonpolymeric polyol of the mixture may be a triol such as glycerol or trimethylol ethane or even a polyol having a greater number of hydroxyl functionalities such as pentaerythritol. It is to be noted that the polymeric diols and the non-polymeric polyols of the mixture are separately inoperative in producing the plasticizer resistant materials of the present invention, although they may be used in small amounts, in addition to the polymeric polyol member, to modify particular copolyester properties.

The polymeric polyol member of the copolyester chain extends the intermediate copolyester formed by the aromatic dicarboxylic acid member, the aliphatic dicarboxylic acid member, and the glycol member, producing a copolyester of relatively high molecular weight. It facilitates the economical manufacturing of the copolyester by permitting a copolyester of high molecular weight to be produced under very mild conditions; that is temperatures of 225°–265° C., pressures of 1–30 mm. Hg. absolute and polycondensation periods of 2–7 hours. As earlier noted, in the absence of the polymeric polyol member, high molecular weight copolyesters useful for particular adhesive applications (for example, adhesives for vinyl substrates) are not obtainable under any conditions. The thermoplastic high molecular weight copolyesters thus formed exhibit low melt viscosity and good thermal stability, two important parameters for hot melt adhesives, as well as excellent wetting characteristics, good heat and cold resistance, good cohesive strength, light color, and compatibility with a large variety of tackifying resins, plasticizers, waxes, solvents, modifiers, pigments, etc. Typical copolyesters of the present invention have intrinsic viscosities of 0.5–0.8 and melt viscosities of 300,000–800,000 cps. at 325° F.

Use of the polymeric polyol member further provides a copolyester which is particularly well suited for use with vinyl substrates, especially when compounded into an appropriate adhesive formulation, such formulations exhibiting a 40–150 ozs./linear inch peel strength with less than a 30% decrease after aging for one week at 70° C. and less than 0.5% shrinkage of a vinyl substrate (with no adhesive splitting or transfer) after aging for one week at 70° C. By way of comparison, formulations based on similar copolyesters not containing the polymeric polyol member (e.g., those using a polymeric diol or non-polymeric polyol only) exhibit a similarly low rate of shrinkage, but are not as resistant to plasticizer, the peel strength decreasing more than 50% on aging for one week at 70° C., with accompanying adhesive transfer and splitting. The improvement in the resistance to plasticizer by chain extension of the copolyester with the polymeric polyol member is specific to copolyesters which have been chain extended with a polymeric polyol member. Chain extension of an aromatic dicarboxylic acid member/aliphatic dicarboxylic acid member/glycol copolyester exclusively with polymeric diols, such as NIAX POLYOL PCP 0210, or with nonpolymeric polyols, such as trimethylol propane, does not result in a copolyester exhibiting the improved plasticizer resistance.

The mechanism by which the polymeric polyol member contributes to plasticizer resistance and improved aging characteristics is not completely understood. It is believed that plasticizer migration from the vinyl substrate into the copolyester adhesive does occur with the adhesives of the present invention, but that the highly chain-extended copolymers are able to withstand the plasticizers without significant change in their properties. It is further believed that the crystallinity inherent in the copolyesters of the present invention plays a significant part. It is for this reason that a symmetrical aromatic dicarboxylic acid member is preferably used in formation of the copolyester. Additionally it is believed that the polarity inherent in the copolyesters of the present invention also plays a significant part. It is for this reason that the polymeric diol or polyol preferably is a polycaprolactone derivative.

All of the copolyesters of the present invention exhibit a low glass transition temperature, $T_g$ (that is, the temperature at which the amorphous region of the crystalline polymer changes from a fluid to a glassy solid) and a high polymer melting point, $T_m$ (that is, the temperature at which the crystals in the polymer begin to melt). These are significant properties for an adhesive as its heat resistance is generally a function of its polymer melting point and its cold resistance is generally a function of its polymer glass transition temperature. Thus the preferred copolyesters of the present invention are tough, resilient, thermoplastic polymers having a glass transition temperature less than 0° C. and a polymer melting point up to 180° C.

The total dicarboxylic acid members are composed of 20–80 mole percent of the aromatic dicarboxylic acid member and correspondingly 80–20 percent of the aliphatic dicarboxylic acid member. The polymeric polyol member is present in the copolyester in an amount of 0.1–6.0 mole percent of the total dicarboxylic acid members, and preferably 0.3–3.0 percent. When the polymeric polyol member comprises the mixture of a polymeric diol and a non-polymeric polyol, each ingredient of the mixture is present in the aforementioned amount. It is noted that the use of non-polymeric polyols tends to raise the glass transition temperature and so may not be desirable in particular adhesives, especially adhesives intended for pressure-sensitive applications.

The polymeric polycarboxylic acid member comprises a polymeric polycarboxylic acid having a carboxyl functionality greater than 2 or an acid-functioning derivative thereof. The member typically has a molecular weight of at least 450, and preferably 800–2,000. Representative of the polymeric polycarboxylic acid members are the polymeric polycarboxylic acids such as EMPOL 1040 and 1041 Trimer Acids and EMPOL 1054A and 1056A Polybasic Acids (all available from Emery Industries), the derivatives or reaction products thereof with epoxides and/or alcohols, the reaction products of polyols with dicarboxylic acids, etc. Use of the polymeric polycarboxylic acid member contributes greatly to an enhanced heat stability of the copolyester. When used, the polymeric polycarboxylic acid member may be used in an amount up to 6.0 mole percent of the total dicarboxylic acid members in the copolyester, provided, however, that the total of the polymeric polyol, polymeric diol, and polymeric-polycarboxylic acid member do not exceed 6.0 mole percent. When the polymeric polyol and polymeric polycarboxylic acid members combined exceed 6.0 mole percent, the copolyester tends to be undesirably cross-linked.

The proportions of the various members present in the copolyester of the present invention will vary according to the application intended for the copolyester. The aromatic dicarboxylic acid member combined with the glycol member provides heat resistance and strength; the aliphatic dicarboxylic acid member combined with the glycol member provides resilience, toughness, tack and cold resistance. The polymer melting point will vary particularly with the choice of the glycol and aromatic dicarboxylic acid members, as well as the ratio of the aromatic dicarboxylic acid/aliphatic dicarboxylic acid members. When the glycol forms a relatively low melting polymer with the aromatic dicarboxylic acid member (for example, where 1,6-hexanediol is reacted with terephthalic acid), a higher ratio of the aromatic dicarboxylic acid/aliphatic dicarboxylic acid members. is required. Where the glycol forms a relatively high melting polymer with the aromatic dicarboxylic acid member (for example, 1,4-butanediol and terephthalic acid), a lower ratio of aromatic dicarboxylic acid/aliphatic dicarboxylic acid members is preferred to retain resilience in the copolyester and minimize its brittleness.

The copolyesters of the present invention may be cured with polyisocyanates, polyanhydrides, epoxides, and the like. Curing effects a cross-linking of the copolyesters primarily through terminal hydroxyl and/or carboxyl groups. Curing usually increases the cohesive and adhesive strength, creep resistance, heat resistance and solvent resistance of the copolyester adhesives, and may also improve its adhesion to particular substrates provided that the glass transition temperature of the copolyester is low enough so that any increase therein due to cross-linking does not cause embrittlement of the copolyester. By way of contrast, curing of conventional copolyesters typically reduces their low temperature flexibility, causing embrittlement and accompanying loss of adhesive and cohesive properties. This is especially true of conventional copolyesters with high glass transition temperatures (close to room temperature and higher), because curing raises the glass transition temperature. A typical curing agent is the reaction product of trimethylolpropane or trimethylolethane (1 mole) and tolylene diisocyanate (3 moles), this reaction product being available at 75 percent solids in ethylacetate solvent from Trancoa Chemical Co. under the trade name TRANCOA 375B. Typically, 16 parts of such a curing solution are utilized per hundred parts copolyester (in the form of a 25 percent solution of the copolyester in toluene).

While many of the copolyesters of the present invention are useful by themselves as adhesives without being modified in any way, it is often advantageous and in some cases even necessary to blend in other components for particular adhesive applications. For example, tackifying resins will typically be incorporated into the copolyester composition, the particular tackifying resin and the quantity thereof being determined by the specific product desired and/or the application desired. Exemplary of such tackifying resins are the rosin esters (such as those available from Hercules Chemical Company under the trade name FORAL 85); the hydrocarbon resins (such as those available from Ziegler Chemical Co. under the trade name ZECOREX 711); the aromatic hydrocarbon resins including styrene polymers and copolymers (such as the low molecular weight polystyrene resins available from Hercules Chemical Company under the trade names PICCOLASTIC A50 and KRISTALEX 3085) and α-methylstyrene/vinyltoluene resins (available from Hercules Chemical Company under the trade name PICCOTEX 100); the coumarone-indene resins (such as those available from Neville Chemical Co. under the trade name NEVILLAC and from Hercules Powder Co. under the trade names PICCOCOUMARONE 410 and PICCO-L); aromatic-aliphatic copolymer resins (such as those available from Velsicol Chemical Corp. under the trade name KLYRVEL); aromatic petroleum oils (such as the paraffinic-naphthenic oils available from Shell Chemical Co. under the trade name SHELLFLEX 683 and from Witco Chemical Co. under the trade name KAYDOL); the phenolic polymer and copolymer resins (such as the terpene-phenolic resins available from Schenectady Chemical, Inc. under the trade name SP-560 and from Reichold Chemical Co. under the trade name NIREZ 2040); the terpene resins (such as those available from Reichold under the trade name NIREZ 1115), and the like. Additionally, various other modifiers including antioxidants (such as 4,4'-thiobis(6-tertiary butyl metacresol) available from Monsanto Chemical Co. under the trade name SANTONOX R, tetrakis [methylene 3-(3', 5'-di-t-butyl-4'-hydroxyphenyl]propionate] methane available from Ciba-Geigy under the trade name IRGANOX 1010, and others available from Weston Chemical Company under the trade name WESTON PHOSPHITE), plasticizers (such as dioctyl phthalate), both oxidized and non-oxidized polyethylene waxes (such as those available from Petrolite Corp. under the trade names POLYWAX E-730 and POLYWAX 1,000), pigments (such as calcium carbonate, silicon dioxide, titanium dioxide, zinc oxide), modifiers (such as styrene/butadiene copolymers, styrene/isoprene copolymers, ethylene/vinyl acetate copolymers), inert fillers (such as barium sulfate), and materials to increase bonding speeds (such as the hydrogenated castor oil available from Baker Castor Oil Co. under the trade name CASTORWAX).

The copolyesters of the present invention are formed in the following manner. Typically in Stage I the ester form of the aromatic dicarboxylic acid member and an excess of the glycol member are reacted at elevated temperature (140°-215° C.) in the presence of a catalyst until the theoretical yield of the condensation or ester interchange product liberated is distilled off (2-7 hours). In Stage II, the desired quantity of aliphatic dicarboxylic acid member is added along with an entraining agent, such as toluene or xylene, and heating is continued under reflux at elevated temperatures (200°-230° C.) until the theoretical yield of water formed as a result of the condensation reaction of the aliphatic dicarboxylic acid is distilled off and the Acid No. is not in excess of 1.0 (mg. KOH/g sample) 2-7 hours). To assure completion of the reaction, a large excess (up to 100%) of glycol is used in all cases and is later removed during the polycondensation reaction. (Alternatively, Stages I and II may be combined by introducing the acid form of the aromatic dicarboxylic acid member, the glycol member and the aliphatic dicarboxylic acid member into the reaction vessel simultaneously and co-reacting them). After the water is distilled off, the polymeric polyol member and optional polymeric polycarboxylic acid member (if any) are introduced into the reaction vessel, the pressure is gradually reduced to about 1-30 mm. Hg. absolute, and the ingredients are heated to and maintained at about 225°-265° C., preferably 250°-265° C., for about 2 to 7 hours until a viscous product is obtained. The product of this chain-extending polycondensation reaction may be conveniently discharged from the reaction vessel into a silicone release coated container. Typical products exhibit an intrinsic viscosity of 0.5-0.8 (in 60/40 phenol/tetrachloroethane solvent, at 25° C.) and a melt viscosity of 3000-8000 poises at 325° F.

Various catalysts can be used in connection with the various reactions. For example, the first condensation reaction between aromatic dicarboxylic acid member and the glycol member may be catalyzed by individual catalysts such as antimony trioxide, litharge, glycol soluble compounds of titanium or cobalt, zinc acetate, or by combination catalysts such as lead acetate/litharge or dibutyltin oxide/antimony trioxide, or by any of the other conventional polyesterification catalysts. Similarly, the second condensation reaction (that is, the reaction of the first product and the remaining glycol with the aliphatic dicarboxylic acid member) may be catalyzed by the same or different catalysts.

To preclude possible oxidation of the products during manufacturing a nitrogen atmosphere may be employed. Antioxidants may also be added at various stages of the reaction, preferably a small amount in the initial mix and a larger amount being added shortly before discharge of the product. The various tackifying resins, ultraviolet stabilizers, fillers and the like may be added in conventional quantities and according to conventional procedures, as desired. When used, the tackifying resin will be present in amounts up to 75%, preferably not more than 55%, by weight of the total adhesive composition including the tackifying resin. Useful fillers (extenders and pigments) include, for example, silica, barium sulfate, calcium carbonate and zinc oxide, and these can be used in amounts up to 50% by weight of the total adhesive composition including the filler. Various waxes, such as paraffin, microcrystalline and synthetic waxes, may also be included in these adhesives in amounts up to about 50% by weight of the total adhesive composition including the wax.

Examplary of the efficacy of the products and processes of the present invention are the following examples in which all parts are by weight unless otherwise specified.

EXAMPLE I

This example illustrates preparation of copolyesters I-XV of the present invention using the ingredient additions of Table I for Stage I, Table II for Stage II, and Table III for Stage III.

A 2-liter 4-neck round bottom pyrex flask was equipped with mechanical stirrer, thermometer, nitrogen inlet, 18 inch Vigreux column, 20 ml. distillation receiver and condenser. The Stage I addition was introduced into the reaction flask and heated (by means of a heating mantle and variable transformer) to the indicated maximum temperature until the theoretical yield of methanol was distilled off in the time indicated. Thereafter, the Stage II addition was introduced into the reaction flask, and the reaction continued within the indicated temperature range under reflux for the indicated time until the theoretical yield of water was distilled off and the product had the indicated Acid No. (mg. KOH/g. sample). Then the Stage III addition was introduced into the reaction flask and the pressure (after removal of the Vigreux column) was gradually reduced (by means of a water aspirator or vacuum pump) to the indicated range, while the ingredients were heated to and kept in the indicated temperature range for the indicated periods. Finally, the viscous product was discharged from the reaction flask onto a silicone release paper and allowed to set (crystallize) overnight. The product was tested with the results indicated in Table III.

EXAMPLE II

This example illustrates the use of Copolyester I as an adhesive. Copolyester I was suitable for use as an adhesive without any further modification (i.e., without curing or blending with other ingredients) and applicable either as a solution adhesive or as a hot melt adhesive.

The suitability of Copolyester I for use as an automotive oil filter adhesive was tested by applying the adhesive in molten form (about 400° F.) to the die-cut paper used in sealing the paper element of an automotive filter. The copolyester exhibited the necessary resistance to hot motor oil as evidenced by adhesive bonds made therewith remaining unaffected after immersion of three days in hot motor oil (250° F.). No swelling, softening or degradation of the adhesive or any weakening of the adhesive bond was observed.

EXAMPLE III

This example illustrates the use of Copolyester II as an adhesive. Copolyester II was inherently pressure sensitive and did not require tackification with tackifying resins or other modifiers.

To test the adhesive properties of Copolyester II, the following elements were blended at room temperature until complete solution was obtained:
50.0 parts Copolyester II
37.5 parts toluene
37.5 parts heptane
42.0 parts methylene chloride.

The blend was deposited on a one mil thick film of MYLAR (DuPont's trade name for a polyethylene terephthalate ester) by means of a stainless steel wirewound rod and aged overnight at room temperature to provide a one mil thick dry film. Then the coated specimens were laminated to stainless steel plates.

After the aging period described below, the coated substrate was peeled away from the stainless steel plate of a specimen at an angle of 180° and at the rate of 30 cm. per minute using an Instron Tensile Tester Model No. 2TC284. The peel strength after one-half hour of aging at room temperature was recorded as initial peel strength, and the peel strengths after aging for one week (in one instance at 140° F.) were recorded as the aged peel strengths. Similarly, after the aging periods described above, a 500 gram weight was suspended from the MYLAR strip of the specimen, and the time required for separation of the strip from the plate recorded as the hold strength. The results are reported in Table IV.

EXAMPLE IV

This example illustrates the use of Copolyester III as an adhesive. Copolyester III was inherently pressure sensitive down to 0° C. Its peel and hold strengths were tested by the procedure of Example III, with the results reported in Table IV.

EXAMPLE V

This example illustrates the utility of Copolyester IV as a solution adhesive which is cured with a polyisocyanate primarily through terminal hydroxyl groups.

To test the adhesive properties of cured Copolyester IV, four parts of TRANCOA 375B (75% in ethyl acetate solvent) was added to 100 parts of a 25% solution of Copolyester IV in toluene. The mixture was deposited on a 1 mil thick film of MYLAR by means of a stainless steel wirewound rod to provide a 3 mils (dry) thick film of the mixture. After removal of the solvent by evaporation and hot air, the coated MYLAR specimens were then laminated to one mil thick aluminum foil and aged overnight at room temperature. The specimens were tested for initial and aged (one week at room temperature) peel or bond strength, with the results reported in Table IV.

EXAMPLE VI

This example illustrates the utility of other cured copolyesters of the present invention as adhesives.

After curing as in Example V (in some cases with 4 percent TRANCOA additive and in other cases with 8 percent TRANCOA additive), Copolyesters V-XI were tested for initial and aged bond strength by the procedure of Example V, with the results reported in Table IV.

In the case of Copolyester X, the test composition was a 50/50 blend of Copolyester X/PICCO-L 60 (rather than just the copolyester) and was dissolved in a 88.3/11.7 toluene/methyl ethyl ketone blend (rather than just toluene).

In the case of Copolyester XI, the test composition was a 70/30 blend of Copolyester XI/NIREZ 2040 (rather than just the copolyester) and was dissolved in a 50/50 toluene/methylene chloride blend (rather than just toluene). The composition was cured with a PCP 0310/tolylene diisocycanante adduct rather than TRANCOA 375B.

EXAMPLE VII

This example illustrates the utility of Copolyester XII and related copolyesters in adhesive compositions for laminating plasticized vinyl films of various thicknesses to particle board plywood or other rigid substances.

The ingredients of the adhesive composition:
50 parts Copolyester XII
50 parts PICCO- 60
0.2 parts IRGANOX 1010
were blended at 300° F. until a uniform solution was obtained. The initial melt viscosity of the blend at 300° F. was 25,000 cps and the aged melt viscosity (after 50 hours of aging at 300° F.) was 16,000 cps.

To test peel strength, 1-2 mil coatings of the adhesive blend were cast on particle board by means of a preheated glass rod at about 300° F. and allowed to cool to room temperature. The adhesive was heat reactivated (by means of a heat gun) to about 300° F. and applied to a 3-6 mil thick plasticized flexible vinyl film to form a laminate. The laminate was aged at room temperature and 50% relative humidity for 72 hours. Initial peels were 25-30 lbs. per linear inch with vinyl destruction and the aged peels (after 24 hours aging in an oven at 51° C.) were 10-15 lbs. per linear inch at 49° C. These values compare favorably with the 5-7 per linear inch (at 120° F.) deemed acceptable by industry.

To test shrinkage, a 5 inch × 5 inch specimen of vinyl was laminated to particle board using the adhesive blend described above. After aging of the laminate at room temperature for 72 hours, an "X" was cut into the vinyl with a razor blade, the legs of the "X" terminating in each corner of the vinyl. After "X" was cut, the specimens were placed in a 160° F. oven for one week and shrinkage of the vinyl was measured before and after cooling by measuring any gap widening along the cut vinyl. Average values were less than 0.005 inches, which compares favorably with the 0.015 inch maximum deemed acceptable by industry.

Copolyesters XIIA and XIIB were prepared in the same fashion as Copolyester XII, except that the amount of PCP 0300 was reduced from 30.6 parts to 26.0 and 20.8 parts, respectively. The physical properties of the copolyesters were as follows:

| Properties | Copolyesters | | |
|---|---|---|---|
| | XII | XIIA | XIIB |
| $T_g$, °C | −39 | −39 | −37 |
| $T_m$, °C | 52, 96 | 51, 96 | 48, 100 |
| I.V., dl/g | 0.84 | 0.70 | 0.64 |

Copolyesters XIIA and XIIB were blended and tested in the same manner as Copolyester XII. The initial and aged melt viscosity were as follows:

| Melt Viscosity at 300° F | Copolyesters | | |
|---|---|---|---|
| | XII | XII A | XII B |
| Initial, cps | 25,000 | 24,000 | 26,500 |
| Aged (50 hrs, 300° F), cps | 16,000 | 18,000 | 18,500 |

Initial and aged peel strength as well as shrinkage performance for the blends including Copolyester XII, XIIA and XIIB, respectively, were comparable.

EXAMPLE VIII

This example illustrates the use of formulated copolyester XIII in adhesive compositions for laminating FORMICA to particle board.

The ingredients of the adhesive composition:
80 parts Copolyester XIII
20 parts of PICCOVAR-L 30
1.0 part SANTONOX R were blended at 350° F. until a uniform solution was obtained. A thin coating of the molten adhesive, approximately 0.020 inches, was applied uniformly on 2 inch × 3 inch particle board blocks by means of a preheated glass rod and allowed to cool to room temperature. The adhesive was then reactivated by means of a hot air gun and 3 inch × 4 inch sections of FORMICA were placed over the blocks, allowing approximately 1 inch overhang all around. The specimens were then placed in a press and pressure of 500 psi were applied to each for a period of one minute. The specimens were then aged overnight at room temperature.

Some of the aged specimens were trimmed on a saw to remove all of the overhang and a small amount of particle board, so that the glue line was readily visible. No bond separation was observed. These specimens were then placed in a 160° F. oven and observed daily for any bond separation. None was observed over a seven-day period.

Some of the aged specimens were left untrimmed, and a wedge was driven into the adhesive bond to facilitate manual separation. In all cases a destructive bond was observed, accompanied by fiber tear.

EXAMPLE IX

This example illustrates the use of Copolyester XIV in an adhesive composition for laminating wood.

The ingredients of the adhesive composition
50 parts Copolyester XIV
50 parts PICCO-L 60
were blended at 300° F. until a uniform solution was obtained. The adhesive composition had a melt viscosity of 16,000 cps at 300° F.

A small amount of the molten adhesive composition was applied at about 300° F. on a 1 × 3 × ⅛ inch yellow birch splint with a 1 inch square measured off at one end, the composition being drawn down for the 1 inch line to the end of the splint. A second splint was quickly placed on top of the first one making a bond of 1 square inch. A 500 gram weight was then placed over the laminate and hard manual pressure applied against the weight (and hence against the laminate) for five seconds. When set, excessive adhesive was trimmed off and the laminate was aged for 24 hours at room temperature. The shear strength was measured on an Instron Tester having a cross head speed of 12 inches per minute (this being the speed at which the adhesive bond is pulled apart), a chart speed of 12 inches per minute and a range of 0 to 500 lbs. per square inch. The shear strength was determined to be 395 lbs. per square inch.

EXAMPLE X

This example illustrates the preparation and use in an adhesive formulation of copolyesters of the present invention wherein there is employed for chain extension purposes instead of a polyester polyol: a polyether polyol (Part 1), a mixture of non-polymeric polyol and a polyester diol (Part 2), and a mixture of a non-polymeric polyol and a polyether diol (Part 3).

Part 1

Copolyester XA was prepared exactly as Copolyester X, except that the 30.6 parts of PCP 0300 was replaced by 30.6 parts of PLURACOL TP-440, a polyether polyol believed to be a polymeric triol based on a trimethylolpropane/propylene oxide adduct having a molecular weight of about 440. Copolyester XA was evaluated as a component of a wood adhesive formulation according to the procedure of Example IX and found to have a shear strength of 410 lbs. per square inch.

PART 2

Copolyester XB was prepared exactly as Copolyester X, except that the 30.6 parts of PCP 0300 was replaced by 7.7 parts of trimethylolpropane (a non-polymeric polyol) and 29.0 parts of PCP 0210 (a polyester diol having a molecular weight of about 812). Copolyester XB was evaluated as a component of a wood adhesive formulation according to the procedure of Example IX and found to have a shear strength of 435 lbs. per square inch.

PART 3

Copolyester XC was prepared exactly as Copolyester X, except that the 30.0 parts of PCP 0300 were replaced by 7.7 parts of trimethylol propane (a non-polymeric polyol) and 29.0 parts of POLYGLYCOL 1000 (a polyether diol having a molecular weight of about 1000).

Copolyester XC was evaluated as a component of a wood adhesive formulation according to the procedure of Example IX and found to have a shear strength of 390 lbs. per square inch.

EXAMPLE XI

This example illustrates the criticality of the presence of the polymeric polyol member. Copolyesters identical to Copolyester XII were prepared, except that the polymeric polyol member (30.6 parts of PCP 0300) was omitted or replaced by an equivalent amount of non-polymeric polyol.

PART 1

When the polymeric polyol member was omitted, the control product was darker in color and had an intrinsic viscosity of 0.43, even though pressures of less than 1.0 mm of mercury were employed and the polycondensation time was approximately seven hours. The control product was not evaluated because experience indicates that similar polyesters having intrinsic viscosities less than about 0.50 do not perform well in adhesive applications used with vinyl substrates.

PART 2

Another control product identical to the copolyester of Part 1 was prepared, except that a manganese diacetate/antimony trioxide catalyst combination was used rather than a dibutyltin oxide/antimony trioxide combination. The control product was darker in color and had an intrinsic viscosity of 0.23, even though pressures of less than 1.0 mm of mercury and temperatures of up to 280° C. were employed. The product was not evaluated for the reasons stated in Part 1.

PART 3

When the polymeric polyol member was replaced with an equivalent amount (7.69 parts) of trimethylolpropane, a buildup in melt viscosity and gel formation during polycondensation was noted. The control product had a glass transition temperature of −31° C., a polymer melting temperature of 90° C., and an intrinsic viscosity of 0.70 (filter solution). When used in an adhesive composition for laminating plasticized vinyl film according to the procedure of Example VII, the control composition had an acceptable vinyl shrinkage level, but was unsatisfactory as it gave "zippery" bonds; i.e., there was adhesive failure after aging at room temperature and 50% relative humidity for 72 hours.

As indicated above, some of the copolyesters of the present invention are useful as hot melt adhesives (Copolyester I and XII-XIV), while others are useful primarily as solution adhesives (Copolyester II-XI, XV). Some of the copolyesters are inherently pressure sensitive (Copolyesters II-IV), while others are not. Some of the copolyesters may be utilized by themselves and without curing (Copolyesters I-III), while others require only curing (Copolyesters IV-XI, XV), and still others require the addition of various tackifying resins and the like (Copolyesters XII-XIV). Copolyester XV (containing both a polymeric polyol member and a polymeric polycarboxylic acid member) affords enhanced heat stability and is thus particularly useful when compounded as a hot melt adhesive.

Various copolyesters of the present invention are especially useful for particular adhesive applications — for example, for automotive oil filters (Example II), polyester films such as MYLAR films (Examples III-VI), plasticized vinyl films (Example VII), and wood (Example VIII-IX).

The copolyesters of the present invention are all characterized by a high molecular weight range. Accordingly they generally exhibit excellent cohesive properties and a high degree of plasticizer resistance. Those copolyesters having a relatively high molecular weight are particularly suitable for hot melt adhesive applications where intrinsic viscosities of 0.5-1.0 (in 60/40 phenol/tetrachloroethane solvent, at 25° C.) are generally desired. Such products are also particularly well suited for solution adhesives because although low molecular weight polymers (as evidenced by intrinsic viscosities of less than 0.5) can be tolerated for this application, high molecular weight polymers are preferred for maximum initial (green) bond strength. Those copolyesters having a relatively low melting temperature are particularly useful as solution adhesives and, when appropriately cured, form tough, flexible films.

Generally, the copolyesters of the present invention exhibiting a low level of crystallinity are pressure sensitive even without the use of tackifying resins, while those exhibiting a high level of crystallinity are pressure sensitive only as part of compositions including tackifying agents.

In many respects, the products of the present invention are superior to the earlier mentioned chain-extended aromatic dicarboxylic acid/dimer acid/glycol copolyesters. The copolyesters of the present invention are compatible with a wide variety of hydrocarbon-type solvents (such as toluene, xylene, hexane, etc.), both oxidized and non-oxidized polyethylene waxes, and tackifying resins.

For example, the products are at least partially compatible with alkyl aromatic resins, styrene resins, terpine-pheonlic resins, rosin ester resins, hydrocarbon resins, coumarone-indene resins, hydrogenated castor oil, paraffinic-naphthenic oils, etc the copolyesters of the present invention especially those having intrinsic viscosities of at least 0.8 and formulated viscosities of at least 70,000 cps at 350° F., are useful in adhering the urea- and phenol-formaldehyde resins (such as FORMICA) to particle board and other substrates. Many of the copolymers of the present invention are extremely slow setting and remain tacky for periods of up to several days, so that adequate wetting of the substrate occurs, thus avoiding premature shrinking of the adhesive composition and insuring formation of a strong adhesive bond. To summarize, novel copolyesters are described which are useful adhesives in a variety of applications. The novel copolyesters exhibit a high degree of resistance to plasticizer migration from vinyl substrates, and in addition reduce the shrinkage of vinyl substrates. In addition to their use as adhesives, the described copolyesters may also find use as coatings for metals, wood, paper and textiles.

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

TABLE I

| COPOLYESTER | I | II | III | IV | V | VI | VII | VIII |
|---|---|---|---|---|---|---|---|---|
| STAGE 1: | | | | | | | | |

TABLE I-continued

| | | | | | | | | |
|---|---|---|---|---|---|---|---|---|
| Dimethyl terephthlate | 388.0 | 194.0 | 194.0 | 388.0 | 291.0 | 291.0 | 291.0 | 291.0 |
| 1,4-Butanediol | 360.0 | 374.0 | — | — | — | — | — | — |
| 1,6-Hexanediol | — | — | 490.9 | 401.2 | 354.0 | 354.0 | 354.0 | 401.2 |
| Triethylene glycol | — | — | — | — | — | — | — | — |
| Dibutyltin oxide | 0.47 | 0.58 | 0.58 | 0.50 | 0.50 | 0.50 | 0.50 | 0.50 |
| Antimony trioxide | 0.19 | 0.23 | 0.23 | 0.20 | 0.20 | 0.20 | 0.20 | 0.20 |
| Santonox R | 0.37 | 0.41 | 0.41 | 0.40 | 0.40 | 0.40 | 0.40 | 0.40 |
| Xylene | 86.0[2] | — | — | — | — | — | — | — |
| Tmax. °C. | 213.0 | 211.0 | 211.0 | 228.0 | 228.0 | 228.0 | 228.0 | 228.0 |
| Time, hrs[1] | 3.0 | 2.0 | — | 2.5 | — | — | — | — |

| COPOLYESTER | IX | X | XI | XII | XIII | XIV | XV |
|---|---|---|---|---|---|---|---|
| Dimethyl terephthlate | 291.0 | 291.0 | 291.0 | 291.0 | 698.4 | 291.0 | 388.0 |
| 1,4-Butanediol | — | 360.0 | — | 360.0 | 414.7 | 360.0 | — |
| 1,6-Hexanediol | 401.2 | — | 401.2 | — | — | — | 401.2 |
| Triethylene glycol | — | — | — | — | 346.1 | — | — |
| Dibutyltin oxide | 0.50 | 0.50 | 0.50 | 0.51 | 1.60 | 0.51 | 0.50 |
| Antimony trioxide | 0.20 | 0.20 | 0.20 | 0.20 | 0.68 | 0.20 | 0.20 |
| Santonox R | 0.40 | 0.40 | 0.40 | 0.41 | 1.30 | 0.41 | 0.40 |
| Xylene | — | — | — | — | 86.0 | 86.0 | — |
| Tmax. °C. | 228.0 | 228.0 | 230.0 | 211.0 | 216.0 | 230.0 | 230.0 |
| Time, hrs.[1] | — | — | 3.0 | 3.5 | 6.5 | 4.0 | 2.0 |

[1]Until theoretical yield of methanol distilled off.
[2]Xylene is sometimes used to prevent sublimation of unreacted dimethyl terephthlate.

TABLE II

| COPOLYESTER | I | II | III | IV | V | VI | VIII | |
|---|---|---|---|---|---|---|---|---|
| STAGE 2: | | | | | | | | |
| Iso-octadecenyl succinic anhydride | 185.0 | 592.0 | 592.0 | — | — | — | — | |
| n-Octenyl succinic anhydride | — | — | — | 210.0 | 210.0 | 210.0 | 210.0 | |
| n-Octodecyl succinic anhydride | — | — | — | — | — | — | — | |
| Succinic anhydride | — | — | — | — | — | — | — | |
| Isophthalic acid | — | — | — | — | — | — | — | |
| Phthalic anhydride | — | — | — | — | — | — | — | |
| Xylene | 86.0 | 86.0 | 86.0 | 86.0 | 86.0 | 86.0 | 86.0 | |
| T, °C.[1] | 180–216 | 217–230 | 217–230 | 184–217 | 184–217 | 184–217 | 184–217 | |
| Time, hrs.[2] | 7.0 | 4.5 | — | 2.0 | — | — | — | |
| Acid No.[3] | 0.5 | 0.5 | 0.5 | 0.5 | 0.5 | 0.5 | 0.5 | |
| COPOLYESTER | VIII | IX | X | XI | XII | XIII | XIV | XV |
| Iso-octadecenyl succinic anhydride | — | — | 388.0 | — | 388.0 | — | — | — |
| n-Octenyl succinic anhydride | 210.0 | 210.0 | — | 210.0 | — | 151.2 | — | 210.0 |
| n-Octodecyl succinic anhydride | — | — | — | — | — | — | 388.0 | — |
| Succinic anhydride | 50.0 | — | — | — | — | — | — | — |
| Isophthalic acid | — | 83.0 | — | — | — | — | — | — |
| Phthalic anhydride | — | — | — | 74.0 | — | — | — | — |
| Xylene | 86.0 | 86.0 | 86.0 | 86.0 | 86.0 | 86.0 | 86.0 | 86.0 |
| T, °C.[1] | 184–217 | 184–217 | 184–217 | 184–217 | 220–224 | 185–220 | 166–225 | 163–217 |
| Time, hrs.[2] | — | — | — | — | — | 5.5 | 3.0 | 3.0 |
| Acid No.[3] | 0.5 | 0.5 | 0.5 | 0.5 | 0.9 | 0.94 | 0.6 | 0.3 |

[1]Heating under reflux
[2]Until theoretical yield of water distilled off
[3]Acid Number in mg KOH/g-sample

TABLE III

| COPOLYESTER | I | II | III | IV | V | VI | VII | |
|---|---|---|---|---|---|---|---|---|
| STAGE 3: | | | | | | | | |
| PCP 0300 | 28.0 | 34.8 | 34.8 | 30.0 | — | — | — | |
| PCP 0310 | — | — | — | — | 25.6 | 17.1 | 8.6 | |
| EMPOL 1041 | — | — | — | — | — | — | — | |
| P, mm Hg[1] | 21–23[5] | 13–0.35 | 13–0.35 | 14–0.3 | 14–0.3 | 14–0.3 | 14–0.3 | |
| T, °C. | 245–262 | 237–240 | 237–240 | 220–250 | 220–250 | 220–250 | 220–250 | |
| Time, hrs. | 2.5 | 6.5 | 6.5 | 5.25 | 5.25 | 5.25 | 5.25 | |
| PROPERTIES[2] | | | | | | | | |
| Tg, °C. | −28 | −42 | −45 | −31 | −40 | −39 | −40 | |
| Tm, °C.[3] | 50,162 | 161[6] | None | 36,81 | 42,70 | 46,63 | 42,76 | |
| IV, dl/g[4] | 0.68 | 0.50 | 0.54 | 0.65 | 059 | 0.79 | 0.86 | |
| COPOLYESTER | VIII | IX | X | XI | XII | XIII | XIV | XV |
| PCP 0300 | — | — | — | — | 30.6 | — | 30.6 | — |
| PCP 0310 | 30.0 | 30.0 | 30.6 | 10.0 | — | 48.2 | — | 15 |
| EMPOL 1041 | — | — | — | — | — | — | — | 15 |
| P, mm Hg[1] | 14–0.3 | 14–0.3 | 14–0.3 | 14–0.3 | 5.5–4.5 | 19–0.8 | 2.0 | 1–1.5 |
| T, °C. | 220–250 | 220–250 | 220–250 | 220–250 | 250–257 | 242–261 | 180–254 | 255–265 |
| Time, hrs. | 5.25 | 5.25 | 5.25 | 5.25 | 4.0 | 3.5 | 1.75 | 1.33 |
| PROPERTIES[2] | | | | | | | | |
| Tg, °C. | −42 | −36 | −37 | −31 | −39 | −17 | −18 | −39 |
| Tm, °C.[3] | 45,74 | 42,108 | 54,100 | 36,55 | 52,96 | 50,105 | 98,130 | 40,76 |

TABLE III-continued

| IV, dl/g[4] | 0.73 | 0.70 | 0.68 | 0.65 | 0.84 | 0.82 | 0.83 | 0.66 |
|---|---|---|---|---|---|---|---|---|

[1]Gradual pressure reduction to this range.
[2]After discharge into silicone release paper and setting (crystallizing) overnight.
[3]First temperature, temperature at which bulk of polymer melted; second temperature, temperature at which the remainder of the polymer melted.
[4]Intrinsic Viscosity in 60/40 phenol/1,1,2,2 - tetrachloroethane solvent at 25° C.
[5]Last 20 minutes at 0.5 mm Hg.
[6]Weak transition.

TABLE IV

| COPOLYESTER | II | III | IV | V | VI | VII | VIII | IX | X | XI |
|---|---|---|---|---|---|---|---|---|---|---|
| PEEL/HOLD TEST[1] | | | | | | | | | | |
| 180° Peel, oz/lin. in. | | | | | | | | | | |
| Initial | 35 | 82 | | | | | | | | |
| Aged, 1 wk., RT | 72 | 80 | | | | | | | | |
| Aged, 1 wk., 140° F. | 58 | 80 | | | | | | | | |
| 180° Hold | | | | | | | | | | |
| Initial | 14.0 hrs. | 44.5 min. | | | | | | | | |
| Aged, 1 wk., RT | 14.5 hrs. | 50.0 min. | | | | | | | | |
| Aged, 1 wk., 140° F. | 13.0 hrs. | 52.0 min. | | | | | | | | |
| BOND TEST, g/lin. in.[2] | | | | | | | | | | |
| 4%, Initial | | | 340 | 275 | 250 | 280 | 250 | 250 | 400 | 400 |
| 4%, Aged[3] | | | 850 | 440 | 450 | 430 | 380 | 430 | 520 | 630 |
| 8%, Initial | | | | 270 | 250 | 250 | 270 | 330 | 300 | 380 |
| 8%, Aged[3] | | | | 500 | 510 | 440 | 490 | 520 | 360 | 620 |

[1]Peel/Hold Test composition:
   Copolyester   50.0 parts
   Toluene   37.5
   Heptane   37.5
   Methylene chloride   42.0
[2]4% & 8% Bond Tests conducted on copolyester cured w/4 and 8 parts, respectively, of TRANCOA 375B per 100 parts of a 25% solution of copolyester in toluene.
[3]Aged one week at room temperature
[4]Bond Test composition: 50/50 blend Copolyester X/PICCO L-60 dissolved in 88.3/11.7 toluene/methyl ethyl ketone
[5]Bond Test composition: 70/30 blend Copolyester XI/NIREZ 2040 dissolved in 50/50 toluene/methylene chloride cured w/PCP 0310/tolylene diisocyanate adduct (instead of TRANCOA 375B)

I claim:

1. A copolyester of
   A. at least one aromatic dicarboxylic acid member selected from the group consisting of aromatic dicarboxylic acids and the acid functioning derivatives thereof;
   B. at least one aliphatic dicarboxylic acid member selected from the group consisting of substituted succinic acids and the anhydrides thereof, said succinic acids having alkyl or alkenyl $C_4$–$C_{36}$ group substituents;
   C. at least one $C_2$–$C_{10}$ glycol;
   D. at least one polymeric polyol member selected from the group consisting of
      (i) a polymeric polyol having a molecular weight of about 300–3,000 and a hydroxyl functionality greater than 2, said polymeric polyol being present in an amount of 0.1–6.0 mole percent of the total dicarboxylic acid members in said copolyester, and
      (ii) a mixture of a polymeric diol having a molecular weight of about 300–3,000, and a nonpolymeric polyol having a hydroxyl functionality greater than 2, said polymeric diol and said nonpolymeric polyol each being present in an amount of about 0.1–6.0 mole percent of the total dicarboxylic acid members in said copolyester; and optionally
   E. a polymeric polycarboxylic acid member selected from the group consisting of polymeric polycarboxylic acids having a carboxyl functionality greater than 2 and the acid-functioning derivatives thereof.

2. The copolyester of claim 1, wherein said aromatic and aliphatic dicarboxylic acid members each comprise 20–80 mole percent of the total dicarboxylic acid members.

3. The copolyester of claim 1, wherein said polymeric polyol member is present in an amount of from about 0.3 to about 3 mole percent of the total dicarboxylic acid members in said copolyester.

4. The copolyester of claim 1, wherein said polymeric polyol member is a polyester polyol.

5. The copolyester of claim 4, wherein said polyester polyol is a polycaprolactone polyol.

6. The copolyester of claim 4, wherein said polyester polyol is the reaction product of a polyfunctional alcohol and a lactone.

7. The copolyester of claim 1, wherein said polymeric polyol member is a polyether polyol.

8. The copolyester of claim 7, wherein said polyether polyol is a trimethylolpropane/propylene oxide adduct.

9. The copolyester of claim 7, wherein said polyether polyol is the reaction product of a polyfunctional alcohol and an alkylene oxide.

10. The copolyester of claim 1, wherein said polyermic alcohol and said polymeric diol each have molecular weights of about 300–1,000.

11. The copolyester of claim 1, wherein said polymeric diol is a polyester diol.

12. The copolyester of claim 11, wherein said polyester diol is a polycaprolactone diol.

13. The copolyester of claim 1, wherein said polymeric diol is a polyether diol.

14. The copolyester of claim 13, wherein said polyether diol is polytetramethylene glycol.

15. The copolyester of claim 1, wherein said aromatic dicarboxylic acid member is symmetrical.

16. The copolyester of claim 15, wherein said aromatic dicarboxylic acid member is selected from the group consisting of terephthalic acid and dimethyl terephthalate.

17. The copolyester of claim 1, wherein said glycol is selected from the group consisting of 1,4-butanediol, 1.6-hexanediol and triethylene glycol.

18. The copolyester of claim 1, wherein said succinic acid substituent is an alkyl group.

19. The copolyester of claim 1, wherein said succinic acid substituent is an alkenyl group.

20. The copolyester of claim 1, wherein said polymeric polycarboxylic acid member has a molecular weight of at least 450.

21. The copolyester of claim 20, wherein said polymeric polycarboxylic acid member has a molecular weight of about 800–2,000.

22. The copolyester of claim 1, wherein said polymeric polyol, said polymeric diol and said polymeric polycarboxylic acid member combined are present in an amount of about 0.1–6.0 mole percent of the total dicarboxylic acid members in said copolyester.

23. A method of preparing a thermoplastic copolyester comprising the steps of
   A. forming an intermediate co-polyester of
      (i) at least one aromatic dicarboxylic acid member selected from the group consisting of aromatic dicarboxylic acids and the acid-functioning derivatives thereof,
      (ii) at least one aliphatic dicarboxylic acid member selected from the group consisting of substituted succinic acids and the anhydrides thereof, said succinic acids having alkyl or alkenyl $C_4$–$C_{36}$ group substituents, and
      (iii) at least one $C_2$–$C_{10}$ glycol; and
   B. chain-extending said intermediate copolyester by reacting said intermediate copolyester and at least one polymeric polyol member selected from the group consisting of
      (i) a polymeric polyol having a molecular weight of 300–3,000 and a functionality greater than 2, said polymeric polyol being present in an amount of about 0.1–6.0 mole percent of the total dicarboxylic acid members in said copolyester, and
      (ii) a mixture of a polymeric diol having a molecular weight of about 300–3,000 and a non-polymeric polyol having a functionality greater than 2, said polymeric diol and said nonpolymeric polyol each being present in an amount of about 0.1–6.0 percent of the total dicarboxylic acid members in said copolyester, and optionally a polymeric polycarboxylic acid member selected from the group consisting of polymeric polycarboxylic acids having a carboxyl functionality greater than 2 and the acid-functioning derivatives thereof.

24. The method of claim 23, wherein said chain-extending reaction is conducted at 225°–265° C.

25. The method of claim 24, wherein said chain-extending reaction is conducted at a vacuum of about 1–30 mm Hg pressure for about 2–7 hours.

26. The method of claim 23, wherein said aromatic and aliphatic dicarboxylic acid members each comprise 20–80 mole percent of the total dicarboxylic acid members.

27. The method of claim 23, wherein said polymeric polyol member is present in an amount of from about 0.3 to about 3 mole percent of the total dicarboxylic acid members in said copolyester.

28. The method of claim 23, wherein said polymeric polyol member is a polyester polyol.

29. The method of claim 28, wherein said polymeric polyol is a polycaprolactone polyol.

30. The method of claim 28, wherein said polyester polyol is the reaction product of a polyfunctional alcohol and a lactone.

31. The method of claim 23, wherein said polymeric polyol member is a polyether polyol.

32. The method of claim 31, wherein said polyether polyol is the reaction product of a polyfunctional alcohol and an alkylene oxide.

33. The method of claim 31, wherein said polyether polyol is a trimethylolpropane/propylene oxide adduct.

34. The method of claim 23, wherein said polymeric polyol and said polymeric diol each have molecular weights of about 300–1,000.

35. The method of claim 23, wherein said polymeric diol is a polyester diol.

36. The method of claim 35, wherein said polyester diol is a polycaprolactone diol.

37. The method of claim 23, wherein said polymeric diol is a polyether diol.

38. The method of claim 37, wherein the polyether diol is polytetramethylene glycol.

39. The method of claim 23, wherein said aromatic dicarboxylic acid member is symmetrical.

40. The method of claim 23, wherein said aromatic dicarboxylic acid member is selected from the group consisting of terphthalic acid and dimethyl terephthalate.

41. The method of claim 23, wherein said glycol is selected from the group consisting of 1,4-butanediol, 1,6-hexanediol, and triethylene glycol.

42. The method of claim 23, wherein said succinic acid substituent is an alkyl group.

43. The method of claim 23, wherein said succinic acid substituent is an alkenyl group.

44. The method of claim 23, wherein said polymeric polycarboxylic acid member has a molecular weight of at least 450.

45. The method of claim 44, wherein said polymeric polycarboxylic acid member has a molecular weight of about 800–2,000.

46. The method of claim 23, wherein said polymeric polyol, said polymeric diol and said polymeric polycarboxylic acid member combined are present in an amount of about 0.1–6.0 mole percent of the total dicarboxylic acid members in said copolyester.

47. An adhesive composition comprising a mixture of
   A. the copolyester of claim 1, and
   B. a tackifying resin in an amount up to 75% by weight of the total adhesive composition including the tackifying resin.

48. An adhesive composition comprising a mixture of
   A. the reaction product of the copolyester of claim 1 and a curing agent selected from the group consisting of polyisocyanates, polyanhydrides, and epoxides, and
   B. a tackifying resin in an amount up to 75% by weight of the total adhesive composition including the tackifying resin.

* * * * *